Nov. 3, 1931.  M. P. GOLOD  1,829,925
MACHINE FOR COUNTING RESTAURANT CHECKS AND
ADDING HIGHEST AMOUNTS INDICATED THEREON
Filed Aug. 5, 1926   4 Sheets-Sheet 1
Fig:1
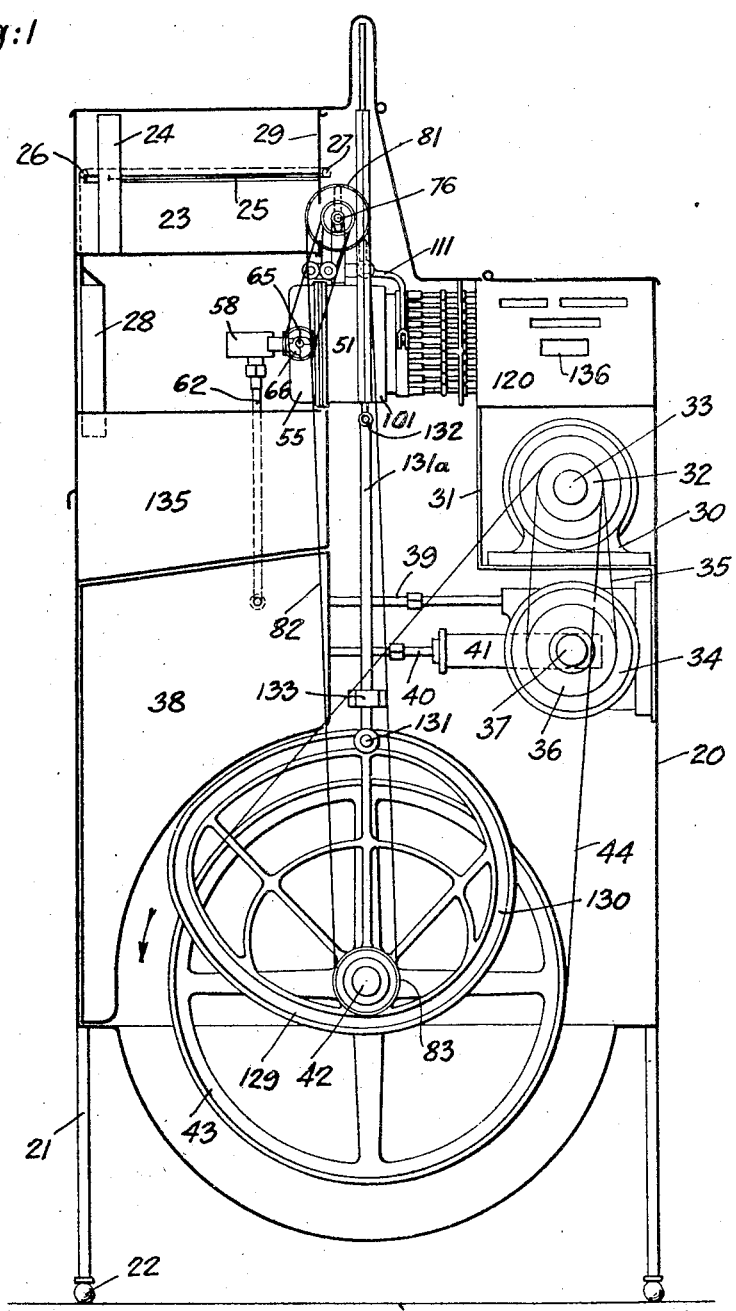
Inventor
MAURICE P. GOLOD
By his Attorney
Walter E. Wollheim Nov. 3, 1931.  M. P. GOLOD  1,829,925
MACHINE FOR COUNTING RESTAURANT CHECKS AND
ADDING HIGHEST AMOUNTS INDICATED THEREON
Filed Aug. 5, 1926  4 Sheets-Sheet 2
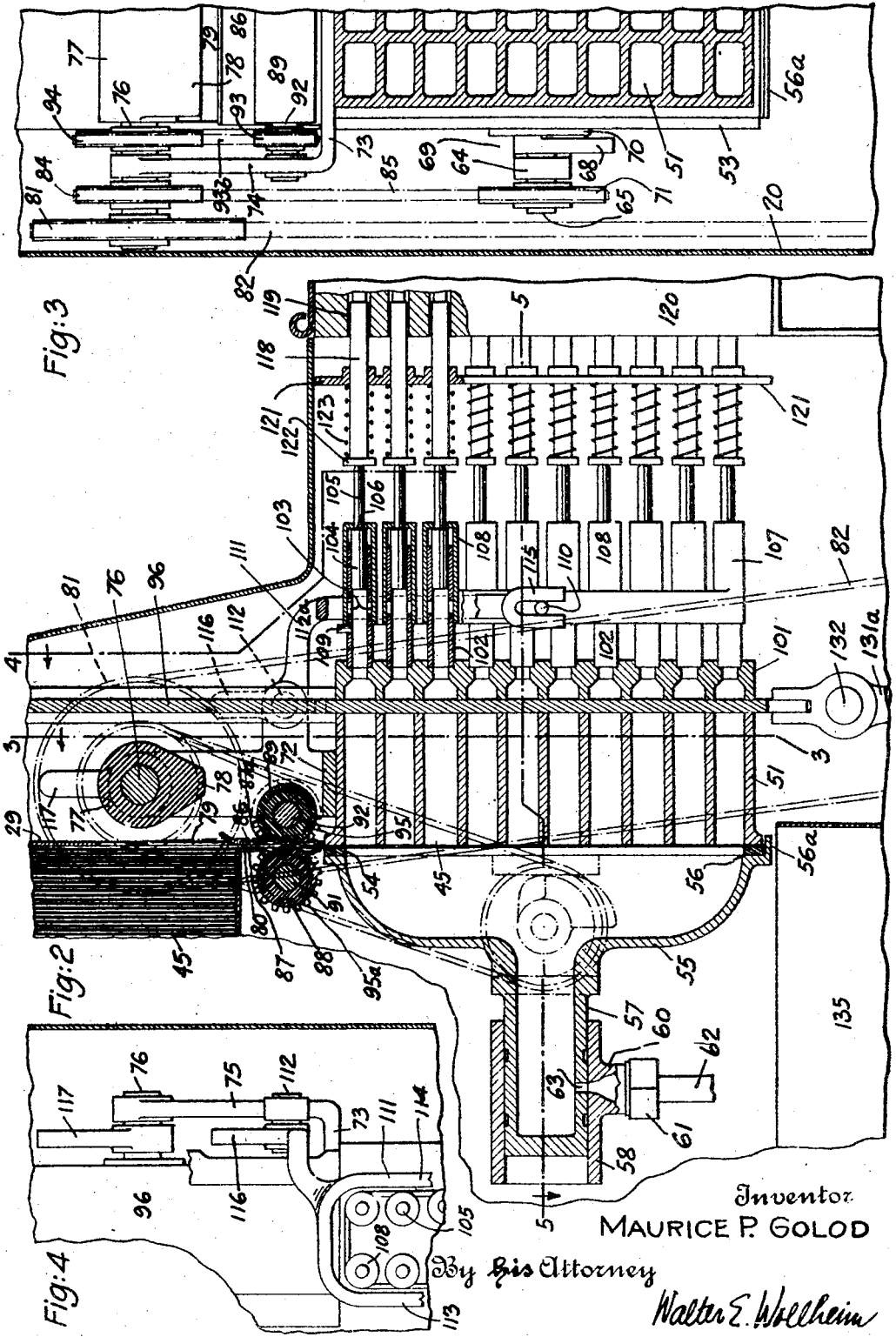
Inventor
MAURICE P. GOLOD
By his Attorney
Walter E. Wollheim Nov. 3, 1931.  M. P. GOLOD  1,829,925
MACHINE FOR COUNTING RESTAURANT CHECKS AND
ADDING HIGHEST AMOUNTS INDICATED THEREON
Filed Aug. 5, 1926   4 Sheets-Sheet 3
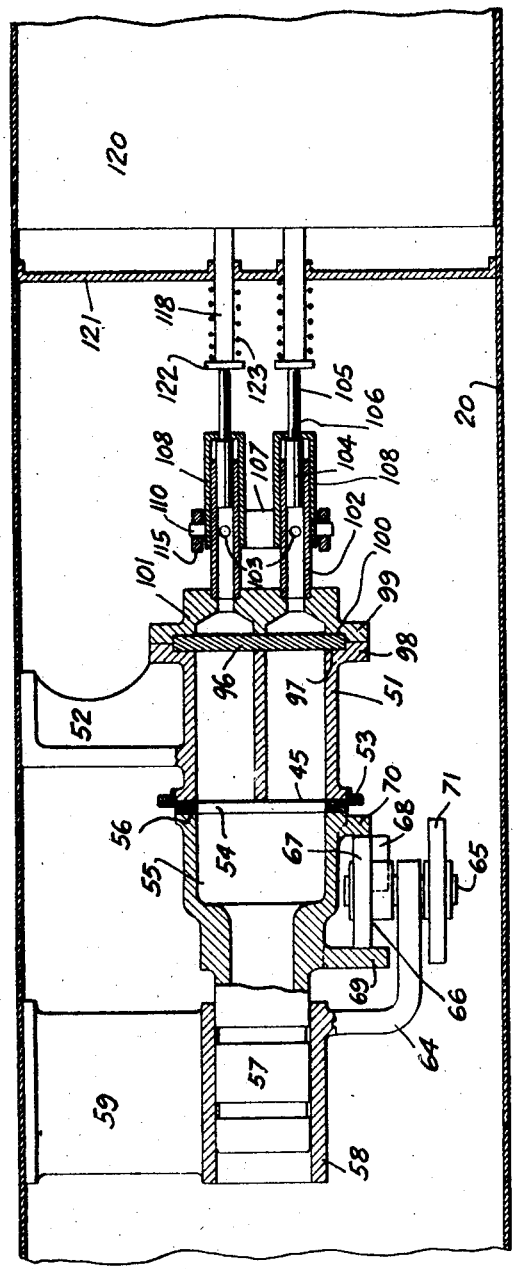
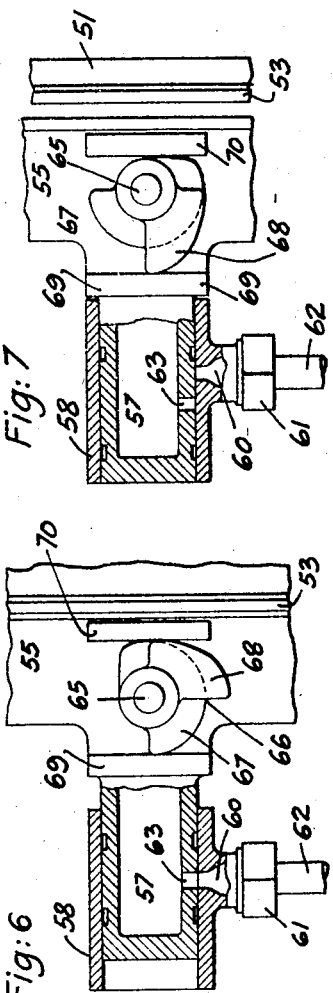
Inventor
MAURICE P. GOLOD
By his Attorney
Walter E. Wollheim

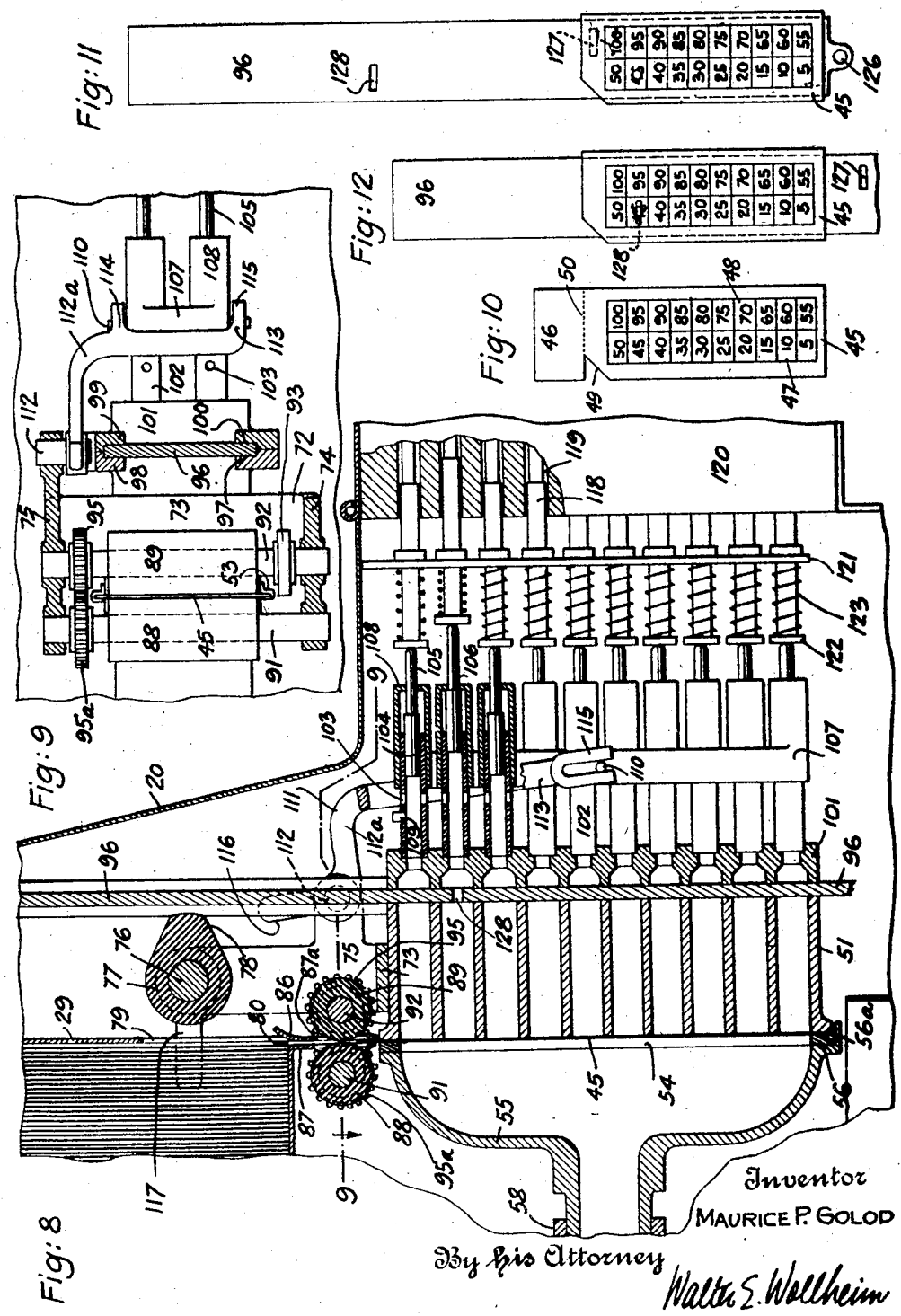

Patented Nov. 3, 1931

1,829,925

UNITED STATES PATENT OFFICE

MAURICE P. GOLOD, OF NEW YORK, N. Y., ASSIGNOR OF ONE-HALF TO JOSEPH NASH, OF NEW YORK, N. Y.

MACHINE FOR COUNTING RESTAURANT CHECKS AND ADDING HIGHEST AMOUNTS INDICATED THEREON

Application filed August 5, 1926. Serial No. 127,338.

This invention relates to machines for counting restaurant checks and adding the amounts indicated thereon.

The usual form of restaurant check consists of an elongated form of ticket on which various amounts, customarily progressing by units of five cents, are printed. The waiter, after serving an order, punches the amount of its cost out of the ticket. If additional orders are served, the corresponding charge of such orders is added to the previously punched amount, so that upon completion of a meal the ticket indicates by the highest amount punched, its total cost.

At the end of a day, heretofore, these tickets or checks were assorted according to their highest amounts and manually counted, for instance, so many checks of 30 cents each, so many checks of 45 cents each, etc. etc. In this manner, very laboriously and consuming much time, the total number of sales per day and the total amounts in dollars and cents were ascertained and used to balance or check the cash on hand. It is obvious that the human element enters a great deal in compiling records of sales and total amounts thereof in this manner, and that the same are subject to various errors incidental thereto, aside from the fact that it takes a considerable length of time to balance the cash, necessitating the employ of special help for this purpose. Moreover, assuming the cashiers or other special help to have completed the work of counting and adding in this manner, in order to check the figures thus obtained, it is the custom for the proprietor of an establishment or his representative to go over the totals again, requiring practically a duplication of this work.

It is the object of this invention to eliminate the human element in the adding and counting of these checks entirely, and to accomplish the desired result solely by mechanical means thereby excluding mistakes.

With this object in view, I provide a machine which automatically registers upon an adding device the highest amount punched on each check, a machine which automatically counts the number of checks registered, a machine which needs but one occasional attendant for the purpose only of feeding the checks into a magazine and removing them from a receptacle after they have been registered and counted.

To attain the foregoing objects, my invention consists, broadly, of a portable machine which comprises a magazine for the reception of restaurant checks, a device for moving the checks from the magazine and to convey them singly to a device which registers, by means of compressed air, the highest amount on each check in an adding machine and simultaneously records the number of individual checks so registered, a discharge compartment into which the checks are dropped after having been registered, and such motor and air pumping means as are needed to keep the entire machine self-contained and operable by connecting to an ordinary lighting circuit.

The nature, characteristic features and scope of the invention will be more fully understood from the following specification taken in connection with the accompanying drawings forming a part hereof, which show for purposes of illustration a form at present preferred by me, although it is to be understood that the various instrumentalities of which my invention consists can be variously arranged and organized and that my invention is not limited to the precise arrangement and organization of the instrumentalities as herein shown and described.

In the drawings,

Fig. 1 is a diagrammatic sectional view through a machine embodying the principles of my invention;

Fig. 2 is an enlarged fragmentary sectional view of the feeding and registering mechanism of the machine;

Fig. 3 is a fragmentary cross sectional view along the plane of line 3—3 in Fig. 2;

Fig. 4 is a fragmentary cross sectional view along the plane of line 4—4 in Fig. 2 with parts of the mechanism broken away;

Fig. 5 is a horizontal sectional view along the plane of line 5—5 in Fig. 2;

Fig. 6 is a fragmentary elevational view partly in section of the check clamping mechanism in a closed position;

Fig. 7 is a view similar to Fig. 6, but in an open position;

Fig. 8 is a fragmentary sectional view similar to Fig. 2, but showing the mechanism during the registering operation;

Fig. 9 is a horizontal sectional view along the plane of line 9—9 in Fig. 8;

Fig. 10 is a check and stub used in connection with the machine;

Fig. 11 is a check, after being torn from its stub and punched with the amount of the meal, and of the valve member of the mechanism in its relation to each other before registering;

Fig. 12 is a similar view, but showing the valve member in registering position.

Like characters of reference denote similar parts throughout the several views and the following specification.

20 is a housing for the machine made preferably of sheet metal, suitably reinforced, being supported upon legs 21 furnished with rollers 22. In the upper left hand corner of the housing is a magazine, rectangular in cross section, 23 to receive the restaurant checks. 24 is a follower, slidably arranged within the magazine, being connected at its sides through a slot 25 with suitable rollers 26 and 27 by means of a cord or the like to a weight 28 which, travelling in a vertical direction, has the tendency of forcing follower 24 horizontally toward an inner wall 29 of the magazine 23 thereby pressing the checks together and toward that wall.

30 is a motor at the right hand side of the housing 20, supported upon a bracket 31, having a driving wheel 32 mounted upon its shaft 33. 34 is an air compressor mounted below the motor 30, driven by a belt 35 connecting a pulley 36 of its shaft 37 with the driving wheel 32 of the motor. Air compressor 34 is connected to an air reservoir 38 in the lower part of the housing 20 by a pipe 39. 40 is a pipe leading from the air reservoir back to the compressor to operate a safety device 41 which automatically stops the compressor when the pressure within the reservoir reaches a certain height.

In the central lower part of the housing 20 is disposed, suitably journalled, a main shaft 42 upon which is mounted a relatively large pulley 43 which is driven by a belt 44 from the motor 30. The ratio between the driving pulley of the motor and the pulley 43 is such that the high speed of the motor is reduced to a relatively low speed at the shaft 42.

45 is the form of restaurant check used in connection with this machine, being bound in book form by stubs 46 at one end. The check has marked on one side thereof two rows of amounts progressing by units of 5 from the bottom to the top, the one row 47 in Fig. 10, for instance, progressing from 5 to 50 and the other row 48 from 55 to 100. An upper corner of the check is cut off at 49, so that the check when severed from its stub 46 along a perforated line 50, presents substantially a rectangular appearance with one corner cut off which serves at a tell-tale when placing the checks into the magazine 23.

51 is a cell block fastened to one side of the housing 20 by a bracket 52. The cell block is divided into 20 cells open at their ends and corresponding in number and size to the divisions on the restaurant checks 45, namely 2 rows of 10 each, adjacent each other. At one end of the cell block adjacent its vertical sides are guide strips 53, so arranged as to hold slidably between them the check 45 in close contact with the open face of the block 51. On the other side of the check is a rectangular rubber gasket 54 of approximately the same size as the face of the block 51. Gasket 54 is fastened to a clamping member 55 which has an elongated open end terminating into a flat surface 56 to match the rubber gasket 54, which is fastened thereto and is provided with a projecting lower lip 56a to form a stop for check 45 when clamping the check. The other end of the clamping member 55 is of piston shape at 57, and is slidably fitted to a tubular support 58 fastened to the rear wall of the housing 20 by a bracket 59. 60 is a hollow threaded nipple forming part of the support 58 having a nut 61 to couple an air pipe 62 to the support 58 which pipe is connected to the air reservoir 38. 63 is an inlet port through piston end 57 into the clamping member, in communication with the air pipe when clamping the check 45 against open face of cell block 51. 64 is an L-shaped bracket extending frontwardly from support 58 and is bored out at substantially right angles to the horizontal axis of the clamping member 55 to receive a shaft 65 on which is mounted between the bracket 64 and the clamping member a cam 66. This cam is substantially a double cam, having an inner or clamping cam 67 and an outer or opening cam 68. 69 is a lug extending frontwardly from the clamping member substantially parallel to the shaft 65 of such a length as to be in line of travel of outer cam 68. 70 is a similar lug at the other side of shaft 65, but shorter than lug 69 so as not to be in line of travel of cam 68. The distance across the opposite faces of lugs 69 and 70 is that of the greatest diameter across inner cam 67. The outer surface of cam 67 is so shaped that during one complete revolution of shaft 65 to which it is securely fastened, it clamps check 45 against the open face of cell block 51 by forcing clamping member 55 and gasket 54 tightly against the check and cell block during one-half revolution by contact of its cam surface with both opposite faces of lugs 69 and 70; during the next one-quarter revolution, it permits the clamping member to travel backwards toward its support away from the cell block by having its distance across its center reduced to provide the necessary clearance within the inner faces of lugs 69 and 70; during the next one-quarter revolution this distance across the cam is again increased gradually until at the end of the one-quarter revolution it reaches its maximum, when the clamping member 55 again forces the check 45 against cell block 51. The outer cam 68 is so shaped that during the one-quarter revolution, while inner cam 67 permits the clamping member to travel toward the support 58, it will force the clamping member toward it. The maximum radial distance from the cam surface of cam 68 is greater than the similar maximum radial distance of cam 67 by the amount of travel of the clamping member and projects beyond the outer cam surface of inner cam that distance. In order to permit this longer cam to act only as an opening means, the lug 70 is made shorter than lug 69 against which outer cam 68 acts, to clear its path. The relative positions of the cams are clearly illustrated in Figs. 6 and 7.

71 is a sprocket wheel mounted on shaft 65, between the bracket 64 and the front wall of housing 20.

Mounted atop the cell block 51 is a bracket 72 substantially U-shaped, its base 73 extending to the front and rear of the block and having an upwardly projected arm 74 at its front and a similar arm 75 at its rear. Journalled in the upper terminals of arms 74 and 75 is a shaft 76, substantially parallel to shaft 65. 77 is a rubber sleeve over shaft 76 of about the width of magazine 23 having a projection 78 of a width somewhat less than an aperture 79 in the wall 29 of the magazine 23 which it is adapted to enter through this aperture while being revolved by shaft 76 for the purpose of pushing the checks 45 nearest the aperture, which checks are forced toward the wall 29 inside of the magazine 23, singly downwardly through an opening 80 at the bottom of the magazine adjacent wall 29. Shaft 76 derives its motion from a sprocket wheel 81 which is mounted on its extreme front end adjacent the front wall of housing 20. This sprocket wheel is connected by a chain 82 to a wheel 83 of the same size which is secured to the main shaft 42. Attached to shaft 76, between the front arm 74 and the sprocket wheel 81 is a smaller sprocket wheel 84 of the same size as wheel 71 mounted on shaft 65 to which it is connected by a chain 85.

Wall 29 of the magazine 23 is extended downwardly at 86 to meet the cell block 51 and the bottom of magazine 23 is also bent downwardly at 87 immediately adjacent opening 80 to provide a guide for the check 45. 87a is an aperture through these downwardly extending guides 86 and 87. 88 and 89 are rubber rollers mounted, respectively, upon shafts 91 and 92 at both sides of aperture 88 adapted to grip check 45 while between the guides and push it downwardly into guide strips 53 to hold it in front of cell block 51. Shafts 91 and 92 are journalled within bracket 72. 93 is a small sprocket wheel on shaft 92 between front end of roller 90 and arm 74 of the bracket, being driven by a chain 93b from a larger sprocket wheel 94 fastened to shaft 76 between arm 74 and the front end of sleeve 77. Roller 89 derives its motion from a gear wheel 95 on shaft 91 located between its rear end and rear arm 75, which gear wheel meshes a similar one 95a on shaft 92 in alignment therewith.

96 is a slide valve at the open outlet end of the cell block 51, guided within a recess 97 of this outlet end which is flanged at 98. 99 is a similar flange and 100 a similar recess within the face of an outlet block 101 which matches the cell block 51 and forms practically an integral unit therewith within which the slide valve 96 is operated. Outlet block 101 is divided into 20 cells similar and matching those in cell block 51. 102 are small outlet tubes secured to the block 101 in approximately the center of each cell. 103 are exhaust ports through the walls of tubes 102. Slidably fitted within each of tubes 102 is a valve plunger 104 having an outwardly projecting extension 105 of smaller diameter forming a shoulder 106 with the plunger. 107 is an exhaust valve consisting of a plurality of small tubes 108 fastened together and fitted slidingly over the outside of tubes 102 and each having one end reduced in diameter to fit over the reduced extension 105 of the plunger 104 adapted to contact with shoulder 106. 109 is a stop pin in each of the two uppermost tubes 102 for the purpose of limiting the travel of the exhaust valve 107 in one direction so as to cover the exhaust ports 103. 110 are outwardly projecting pins at the center of the front and rear portions of the exhaust valve 107. 111 is an exhaust valve closing lever rotatably mounted on a small pin 112 between arm 75 of the bracket 72 and flanges 98 and 99 of the cell block 51 and outlet block 101 respectively, which flanges are extended upwardly to provide additional guides for the slide valve 96. Lever 111 is bent downwardly at 112a and shaped in branches 113 and 114 straddling the exhaust valve 107, each branch terminating in a fork-like end 115 adapted to fit over the pins 110 at both sides of the valve. The upper part of the closing lever terminates in a finger-like extension 116. 117 is another finger secured to shaft 76 between the rear arm 75 of bracket 72 and the rear face of sleeve 77. Finger 117 is adapted to contact with finger 116 of closing lever 111 when the exhaust valve 107 is in an open position, as will be explained hereinafter. 118 are registering pins adapted to enter corresponding openings 119 in an adding machine 120 mounted in the upper right hand corner of the housing 20 preferably directly over the motor 30. The adding mechanism may be of the type shown in the patent to Townsley #452,402, granted May 19, 1891. 121 is a guide plate in spaced relation to the adding machine supporting and guiding registering pins in front thereof. Each of pins 118 is provided with an enlarged head 122 and a spiral spring 123 between the head and guide plate 121 to force the pin away from the adding machine toward the plunger 104, the reduced portion 105 of which contacts with the head 122 of the pin 118.

Slide valve 96 is essentially a flat strip of approximately 3 times the length of check 45. Its bottom is provided with an eye 126. At one side of the face of the slide valve is a small oblong slot 127 so positioned as to slide over cells registering with divisions 55 to 100 of the check 45 without projecting over the vertical dividing wall between the two rows of cells. Slot 127 is spaced from the bottom of the valve 96 about the length of check 45, as is clearly shown in Fig. 11. Similarly a slot 128 is provided again about the length of the check 45 above slot 127, but at that side of the face of the valve which slides over cells registering with divisions 5 to 50. The length of the face of the valve above slot 128 is also about that of the check 45.

129 is a main cam, secured to shaft 42 provided with a groove 130. 131 is a roller engaging groove 130 and forming part of an extension rod 131a which is fastened by a pin 132 to the eye 126 of the slide valve. Extension rod 131ª is slidably guided by a bracket 133. The groove 130 of the cam is so shaped in reference to the center of the cam that the position of the roller with respect to the center remains stationary for about one-quarter revolution during which time slide valve 96 is in the position shown in Fig. 11. During the next one-half revolution, the groove is so shaped that it draws down gradually the roller toward the cam center and thereby the slide valve, about double the length of check 45. During the last one-quarter revolution, the roller travels upwardly away from the cam center until the slide valve again assumes the position shown in Fig. 11.

136 is a revolution counter shown diagrammatically only, connected to, preferably, shaft 76. The connection between the revolution counter and the shaft is not shown but any of the methods well-known in the art can be used.

135 is a discharge compartment removable from housing 20, into which checks 45 are deposited after having been registered.

The operation of the machine is as follows:

The checks 45 are placed in magazine 23 with their printed side facing wall 29, which can easily be accomplished by arranging them so that the cut-off portion 49 of each check is positioned at its upper right side, when facing the wall 29. These checks are closely pressed toward the wall 29 by follower 24 actuated by weight 28. The motor 30 is then started which sets the air compressor 34 in motion and produces pressure in the reservoir 38. While this takes place, the main shaft 42 driven by belt 44 from the motor 30 is disconnected by a clutch or suitable belt shifting device which is not shown in the drawings, being well known in the art. As soon as the pressure has been built up sufficiently in the reservoir, the main shaft 42 is set in operation. The various steps which now take place can best be described in terms of one-quarter revolutions of the shaft 42 and the mechanism driven in synchronism thereby.

During the 1st quarter revolution: The position of the clamping member 55 is open, namely that shown in Fig. 7, at the beginning of the revolution, and projection 78 of the rubber sleeve 77 over shaft 76 is about to enter aperture 79 through wall 29 of the magazine 23. Shaft 76 is connected by sprocket wheel 81, chain 82, to wheel 83, of the same size as 81, which wheel 83 is secured to main shaft 42 and therefore causes shaft 76 to revolve in synchronism with shaft 42. The projection 78 sweeps now past the aperture and forces by frictional contact one of the checks 45 downwardly through opening 80 of the magazine and guides 86, where the check is caught between the rollers 88 and 89 which revolve at higher speed, the small sprocket wheel 93 on shaft 92 of roller 90 being connected by chain 93b to a larger wheel 94 on shaft 76. These rollers grip the check through openings 87a and force the same downwardly into guide strips 53 at both sides of the open end of cell block 51. Simultaneously, the inner cam 67 of double cam 66 which is mounted on shaft 65 deriving its motion from a sprocket wheel 70 connected by chain 85 to the same size wheel 84 on shaft 76 with which it revolves in unison, forces, by pressure against lug 70, the flat face 56 and gasket 54 of the clamping member 55 against the check 45 within the guide strips 53 and the cell block 51 causing a tight joint, at the end of this one-quarter revolution. The position is then the one shown in Fig. 2, when air is admitted inside of the clamping member and through perforations in the check into cells of the cell block in alignment therewith. For purposes of illustration, the check 45 is shown perforated at 45 cents. While all this takes place, the main cam 129 has travelled ¼ revolution, but the distance of the groove 130 from its center being unchanged, the roller 131 has not changed its position relative to the cam center, and the relation between the slide valve 96 and the check 45 is that shown in Fig. 11.

During the 2nd and 3rd quarter revolution: The position of the clamping member 55 has not changed. The inner cam 67 is still holding it toward the cell block 51 owing to the even radial distance of the cam surface to the cam center. The slide valve is drawn downwardly approximately 2 lengths of check 45 by the shape of groove 130 of the main cam which forces the roller 131 downwardly and with it the extension rod 131a and the slide valve 96. During this downward travel of the valve 96, slot 127 slides over open ends of cells registering with divisions 100 to 55 on the check 45 during the 2nd quarter revolution, and slot 128 over cells registering with divisions 50 to 5 on the check during the 3rd quarter revolution. As soon as slot 128 passes that cell of the cell block 51 which registers with 45 cents of the check which is perforated as shown in Fig. 12, compressed air passes through this perforation and outlet block 101 into tube 102 in alignment therewith and pushes plunger 104 outwardly, as shown in Fig. 8. This causes the outer extension 105 of the plunger to force registering pin 118 into the adding device 120 where the amount, 45 cents, is added and indicated upon suitable dials. Simultaneously, the shoulder 106 of plunger 104 moves outwardly the exhaust valve 107, by contact with the reduced portion of tube 108, and opens the exhaust ports 103 of all cells, as is clearly shown in Fig. 8. If the slot 128 now passes cells with registering perforations of check 45, air will not cause the pins 108 in alignment with such cells to register on the adding machine, but the plungers 104 will remain stationary, and the air will escape through ports 103. It is obvious therefore that only the highest amount perforated will be registered first by the slot 127 passing cells in alignment with amounts from 100 down to 55, and second, by the slot 128 passing cells in alignment with amounts from 50 down to 5. As soon as the first perforation is passed which necessarily will be the highest due to the relation of these slots to each other, the amount will be registered and simultaneously the exhaust ports opened, so that any other amounts through additional perforations will not register upon the adding device.

During the last quarter revolution: The slide valve 96 having completed its downward travel in the last 2 quarter revolutions, is now being returned by the shape of the groove in main cam 129 to its starting position. Simultaneously, the distance across inner cam 67 is reduced and outer cam 68 contacting with lug 69 moves the clamping member 55 away from the cell block, shutting off the air, as shown in Fig. 7, and permits the check to drop into the discharge compartment 135 aided by the pushing effect of the next check forced into the guide strips 53. While this takes place, finger 117 mounted upon shaft 76 contacts with extension 116 of the upper arm of the exhaust valve closing lever 111 which has been moved into its path by pins 110 while the exhaust valve was being opened, and rotates the lever about its fulcrum 112, until extension 116 clears the path of finger 117 when the exhaust valve will again be closed and the closing lever in the position shown in Fig. 2. The machine is then ready for a repetition of the several functions above explained. Each complete revolution is recorded upon a meter or counter and represents a check registered upon the adding machine, providing a count of the checks.

While I have shown a preferred form of my invention embodying the various principles of my invention, I do not wish to limit myself to the precise arrangement described and illustrated. So, for instance, while I have shown the adding device having registering openings in 2 rows similar to the divisions of the check, the adding device may be constructed with these openings in one line or several, connected to the registering pins of the mechanism in any suitable form, such as compound levers or other agencies; the openings in the adding device or means for recording the amounts thereon, may be outwardly projecting fingers suitably connected to the registering pins, so that any form of commercial adding devices may be used in connection therewith.

It is understood that various other changes in the form, proportion and minor details of construction may be resorted to without departing from the principle or sacrificing any of the advantages of the invention, as defined in the appended claims.

What I claim as new, is:

1. In a machine for the purpose specified, the combination with a check having various amounts printed thereon and perforations through selected amounts, of means admitting compressed air to pass through said perforations, an adding device, and valve mechanism having means to cause registering of only the highest amount perforated upon said adding device.

2. In a machine for the purpose specified, the combination with a check having various amounts printed thereon and perforations through selected amounts, of a magazine for such checks, a clamping device, means feeding checks singly from the said magazine to the said clamping device, means to hold the check in the clamping device in stationary position, means admitting compressed air to pass through the said perforations, an adding device, and valve mechanism having means to cause registering upon said adding device of only the highest amount perforated on the said check, while being held stationary in the said clamping device.

3. In a machine for the purpose specified, the combination with a check having rows containing various amounts printed thereon in successively progressive order from their bottoms to their tops, of a block having cells in alignment with the said amounts, and a slide valve having slots, each adapted to pass separately and successively rows of cells in the said block.

4. In a machine for the purpose specified, the combination with a check having rows containing various amounts printed thereon in successively progressive order from their bottoms to their tops and perforations through selected amounts, of a block having cells in individual register with each amount of the said check, and a slide valve having slots, each adapted to pass separately and successively rows of cells in the said block, an adding device, and means to register the highest amounts perforated on the said check upon said adding device when a slot in the said valve is brought in alignment with the cell corresponding to that amount.

5. In a machine for the purpose specified, the combination with a check having various amounts printed thereon and perforations through selected amounts, of a check magazine, a clamping device, means to feed checks singly from the magazine into the clamping device, means to close the said clamping device to hold the said single check, an adding device, a slide valve, registering mechanism, and a main operating cam, the said check feeding means, clamping device closing means and the slide valve being operably and synchronously connected to the said main operating cam, the said slide valve and registering mechanism having coacting means operable by compressed air to cause registering of the highest amount perforated on the check held in the said clamping device upon the said adding device.

6. In a machine for the purpose specified, the combination with a check having rows containing various amounts printed thereon in successively progressive order from their bottoms to their tops and perforations through selected amounts, of a block having cells in individual register with each amount of the said check, means admitting compressed air to pass through the said perforations, a slide valve having slots adapted to pass separately and successively rows of cells in the said block, an adding device, a plurality of valve plungers and housings therefor each in alignment with each of the said cells, each in contact with a corresponding registering pin of the said adding device, the said plunger in alignment with the highest amount on the check adapted to be forced against its corresponding pin of the adding device by compressed air admitted into its housing through that slot in the slide valve first passing the cell in alignment with it, mechanism to open exhaust ports in the plunger housings of all cells simultaneously with the registering motion of the aforesaid valve plunger, and means to close automatically the exhaust ports after registering.

7. In a machine of the character described, the combination with a check having various amounts printed thereon and perforations through selected amounts, of means admitting compressed air to pass through said perforations, a plurality of operating members, each corresponding to an amount printed on said check, and valve mechanism having means to cause only the actuation of the operating member corresponding with the highest amount perforated.

In testimony whereof I have hereunto set my hand.

MAURICE P. GOLOD.